United States Patent
Shi et al.

(10) Patent No.: US 12,021,451 B2
(45) Date of Patent: Jun. 25, 2024

(54) DEVICE AND METHOD FOR CONTROLLING DISTRIBUTED POWER CONVERSION SYSTEM

(71) Applicant: Delta Electronics (Shanghai) Co., Ltd., Shanghai (CN)

(72) Inventors: Ling Shi, Shanghai (CN); Wenfei Hu, Shanghai (CN); Hong Liu, Shanghai (CN); Cheng Lu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 292 days.

(21) Appl. No.: 17/654,241

(22) Filed: Mar. 10, 2022

(65) Prior Publication Data
US 2022/0321000 A1 Oct. 6, 2022

(30) Foreign Application Priority Data
Apr. 1, 2021 (CN) .......................... 202110356790.7

(51) Int. Cl.
*H02M 3/04* (2006.01)

(52) U.S. Cl.
CPC ..................... *H02M 3/04* (2013.01)

(58) Field of Classification Search
CPC ............. H02M 3/00; H02M 3/02; H02M 3/04
See application file for complete search history.

(56) References Cited

U.S. PATENT DOCUMENTS

| 7,518,894 B2* | 4/2009 | Fosler | H02J 1/08 363/72 |
| 11,711,019 B2* | 7/2023 | Hu | H02M 1/0074 363/15 |
| 2016/0065077 A1 | 3/2016 | Yamada | |

(Continued)

FOREIGN PATENT DOCUMENTS

| CN | 106655794 A | 5/2017 |
| CN | 111193278 A | 5/2020 |
| JP | 2001016859 A | 1/2001 |

OTHER PUBLICATIONS

Gateau G et al., "Digital Decentralized Current Control for Parallel Multiphase Converter," 2019 IEEE International Conference on Industrial Technology (ICIT), Feb. 13, 2019 (Feb. 13, 2019), pp. 1761-1766.

(Continued)

Primary Examiner — Adolf D Berhane
(74) Attorney, Agent, or Firm — CKC & Partners Co., LLC

(57) ABSTRACT

A method for controlling a distributed power conversion system comprises: configuring N control units for controlling N power modules of the system respectively, wherein each of the control units is configured to execute: step S1, generating a first variable Q1 reflecting respective module serial numbers R according to a coordination variable; step S2, generating a second variable Q2 reflecting the optimal operating number M of the modules; and step S3, comparing the first variable Q1 and the second variable Q2, wherein, when the first variable Q1 is greater than the second variable Q2, the corresponding power module stops; and when the first variable Q1 is less than or equal to the second variable Q2, the corresponding power module runs.

26 Claims, 8 Drawing Sheets

(56) References Cited

U.S. PATENT DOCUMENTS

2019/0319548 A1  10/2019  Nakahara et al.
2019/0334442 A1  10/2019  Iyasu et al.

OTHER PUBLICATIONS

Cousineau Marc et al., "Interleaved converter with massive parallelization of high frequency GaN switching-cells using decentralized modular analog controller," 2015 IEEE Energy Conversion Congress and Exposition (ECCE), Sep. 20, 2015 (Sep. 20, 2015), pp. 4343-4350. *abstract; figure 4*.

Sinha Mohit et al., "Decentralized Interleaving of Parallel-connected Buck Converters," IEEE Transactions on Power Electronics, Institute of Electrical, and Electronics Engineers, USA, vol. 34, No. 5, May 1, 2019 (May 1, 2019), pp. 4993-5006.

* cited by examiner one-stage power modules two-stage power modules

DEVICE AND METHOD FOR CONTROLLING DISTRIBUTED POWER CONVERSION SYSTEM

CROSS-REFERENCE TO RELATED APPLICATIONS

This non-provisional application claims priority under 35 U.S.C. § 119(a) on Patent Application No. 202110356790.7 filed in P.R. China on Apr. 1, 2021, the entire contents of which are hereby incorporated by reference.

Some references, if any, which may include patents, patent applications, and various publications, may be cited and discussed in the description of this disclosure. The citation and/or discussion of such references, if any, is provided merely to clarify the description of the present disclosure and is not an admission that any such reference is "prior art" to the disclosure described herein. All references listed, cited, and/or discussed in this specification are incorporated herein by reference in their entireties and to the same extent as if each reference was individually incorporated by reference.

BACKGROUND OF THE DISCLOSURE

1. Field of the Disclosure

The disclosure relates to the field of power electronic technology, and particularly to a device and method for controlling a distributed power conversion system.

2. Related Art

With progress of the distributed new energy power generation technology and increasing of the DC power devices, the demand for DC distribution, such as, high power storage power conditioning system (PCS), electric vehicle superfast charging station, rail transportation, medium voltage power electronic transformer (MV-PET) system, or the like, is growing. Due to the power limit of a single module, a plurality of modules shall often be parallel combined (at least one port being connected in parallel) to realize applications with a low voltage and a large current on DC side. FIGS. 1A-1C illustrate parallel combination systems such as a Solid State Transformer (SST), an Input Series Output Parallel (ISOP) DC/DC converter, an Input Parallel Output Parallel (IPOP) DC/DC converter, or the like.

To satisfy operating requirement of the system, the DC/DC converter shall further allow high frequency isolation, wide range voltage regulation, and bidirectional operation, and an isolated resonant DC/DC converter is always used. To reduce switching loss, improve efficiency, and reduce gain, the isolated resonant DC/DC converter is often in a burst mode under a light load, such as, an LLC resonant converter, as shown in FIG. 1D. If the DC/DC module is controlled separately without coordination, when the respective DC/DC converters start and stop simultaneously under the light load, the output voltage has a large ripple and large output capacitors are needed.

Since inherent loss such as switching loss, driving loss and conduction loss under the light load takes large proportion of a total loss of the isolated resonant DC/DC converter, efficiency of the isolated resonant DC/DC converter is low under the light load, as shown in FIG. 1E. Currently, most of the modularized parallel converters adopt a power sharing mode, i.e., no matter whether operating in a full power, all modules evenly share the system power, causing that the respective modules are operated at a low power under a light load mode, with low efficiency. Therefore, in the case of a light load, if system loss can be reduced, it may facilitate to enhance an overall operating efficiency of the system.

As for the Input Series Output Parallel (ISOP) system, conventional technology has problems such as input voltage unbalance, high requirement for communication rate, unequal operating time of all modules, inconsistency of aging degree of all modules, single point failure of the centralized controller, increased cost and so on.

SUMMARY OF THE DISCLOSURE

With respect to the problems in the prior art, an object of the disclosure is to provide a device and method for controlling a distributed power conversion system, which determines the modules put into operation by sorting coordination variables of power converters without a centralized controller and reduces cost.

To realize the object, according to one embodiment of the disclosure, the disclosure provides a method for controlling a distributed power conversion system, wherein the distributed power conversion system comprises N power modules connected in parallel, where N is a positive integer, the method comprising:

configuring N control units for controlling the N power modules respectively, wherein each of the control units is configured to execute:

step S1, generating a first variable Q1 reflecting respective module serial number R on basis of a coordination variable;

step S2, generating a second variable Q2 reflecting an optimal operating number M of the modules; and step S3, comparing the first variable Q1 and the second variable Q2, wherein, when the first variable Q1 is greater than the second variable Q2, the corresponding power module stops;

when the first variable Q1 is less than or equal to the second variable Q2, the corresponding power module runs.

According to another embodiment of the disclosure, the disclosure further provides a device for controlling a distributed power conversion system, wherein the distributed power conversion system comprises N power modules connected in parallel, where N is a positive integer, the device comprising:

N control units for controlling the N power modules respectively, wherein each of the control units comprises:

a serial number generating unit for generating a first variable Q1 reflecting respective module serial number R on basis of a coordination variable;

an operating number calculating unit for generating a second variable Q2 reflecting an optimal operating number M of the modules; and a comparing unit for comparing the first variable Q1 and the second variable Q2, wherein when the first variable Q1 is greater than the second variable Q2, the corresponding power module stops; and when the first variable Q1 is less than or equal to the second variable Q2, the corresponding power module runs.

As for the distributed power conversion system comprising N power modules connected in parallel, the control method of the disclosure can coordinate operation among the modules of the system through the coordination variable among the power modules, improve system efficiency, reduce an output voltage ripple and an output current ripple, and realize balanced operation among the modules. The control method of the disclosure is simple and reliable, and as compared to the existing solution, it does not need a centralized controller, avoids the problem of single point failure of the centralized controller, and reduces cost.

The disclosure has a stronger voltage balancing capability of the dc-link voltage while having no influence on system power transmission characteristics through alternative switching of all power modules in a certain sequence, has a low requirement for a communication rate, and is suitable for the distributed power conversion system having multiple modules connected in parallel, for example, including, but not limited to a data center, a charging station, an energy storage system and micro-grid, or the like.

The additional aspects and advantages of the disclosure are partially explained in the below description, and partially becoming apparent from the description, or can be obtained through the practice of the disclosure.

BRIEF DESCRIPTION OF THE DRAWINGS

The exemplary embodiments are described in detail with reference to the accompanying drawings, through which the above and other features and advantages of the disclosure will become more apparent.

FIGS. 4A and 4B are schematic diagrams of switching stages of the modules when a two-stage converter is alternatively switched according to the disclosure, wherein FIG. 4A is one-stage switching, and FIG. 4B is two-stage switching.

DETAILED EMBODIMENTS OF THE DISCLOSURE

Figure 1A:
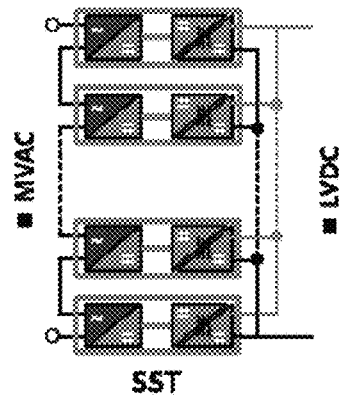
FIGS. 1A, 1B, and 1C are structural diagrams of parallel combination systems such as SST, ISOP DC/DC, IPOP DC/DC in the prior art.
Figure 1B:
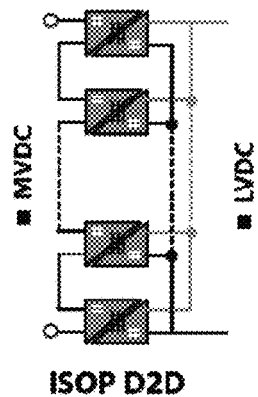
Figure 1C:
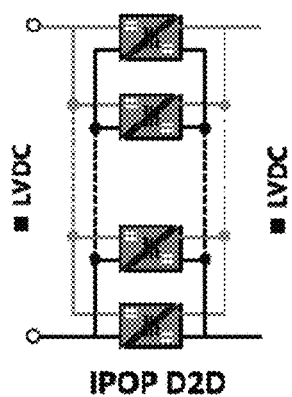
Figure 1D:
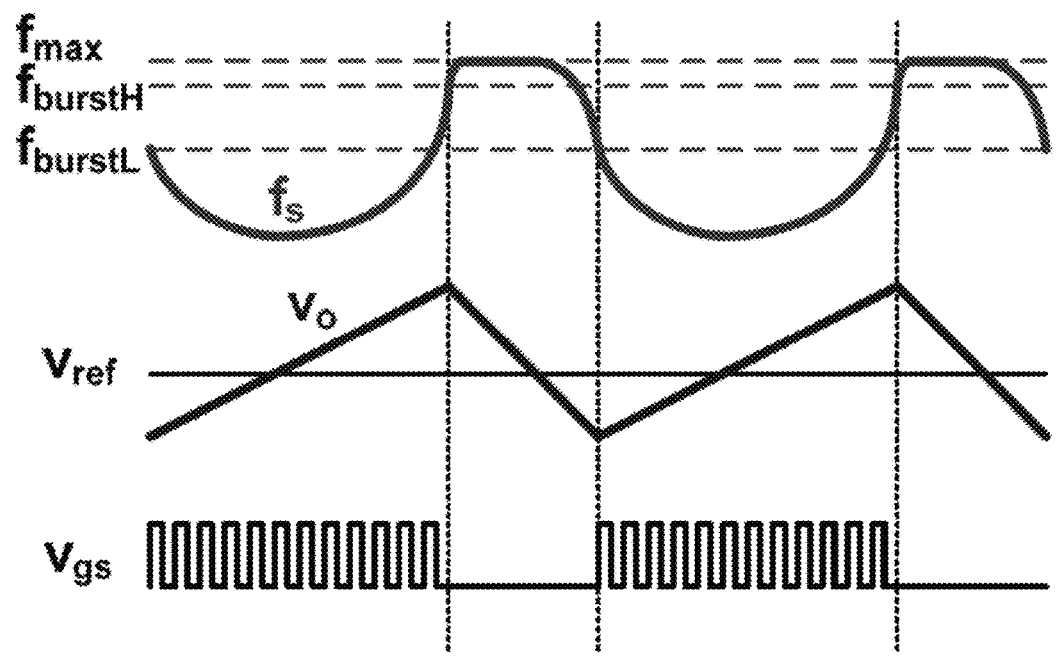
FIG. 1D is a schematic diagram illustrating the operating state of a conventional isolated resonant DC/DC converter in a burst mode under light load.
Figure 1E:
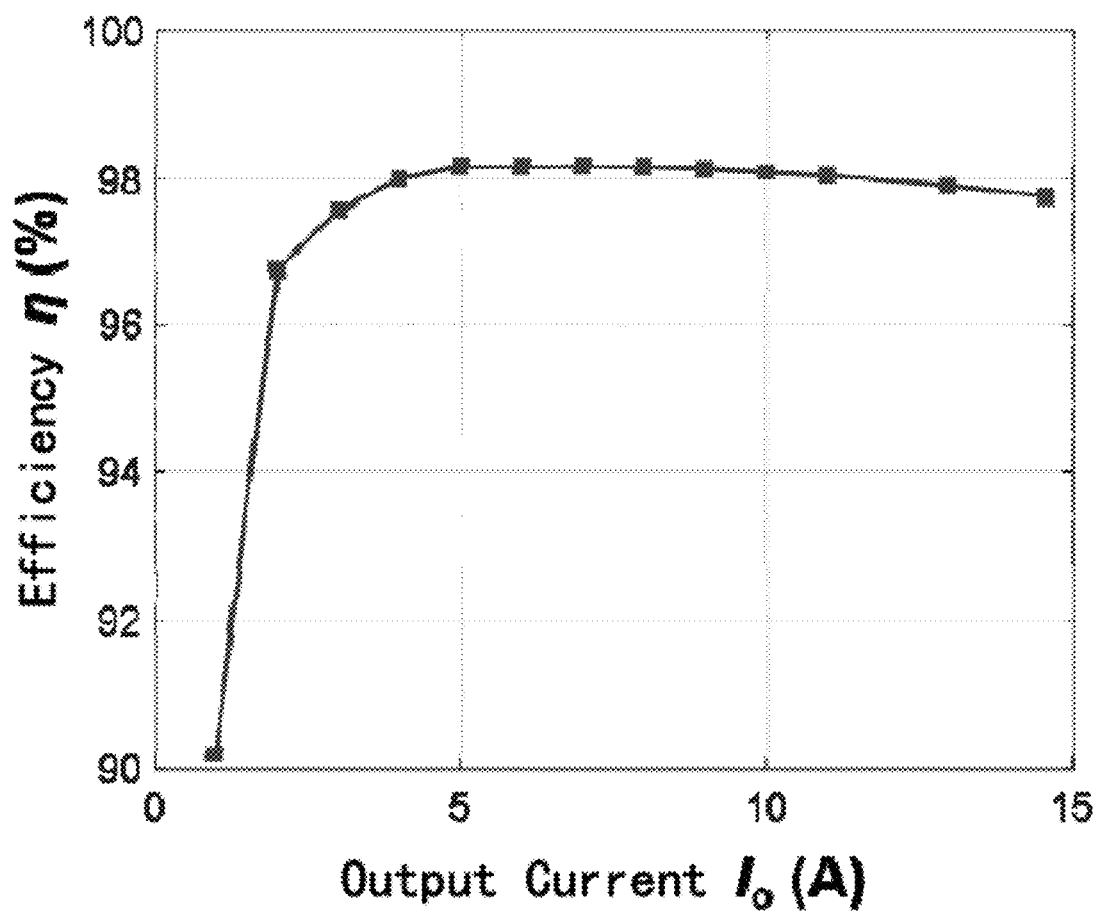
FIG. 1E is a schematic diagram illustrating the efficiency of the conventional isolated resonant DC/DC converter.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this disclosure will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

Figure 2:
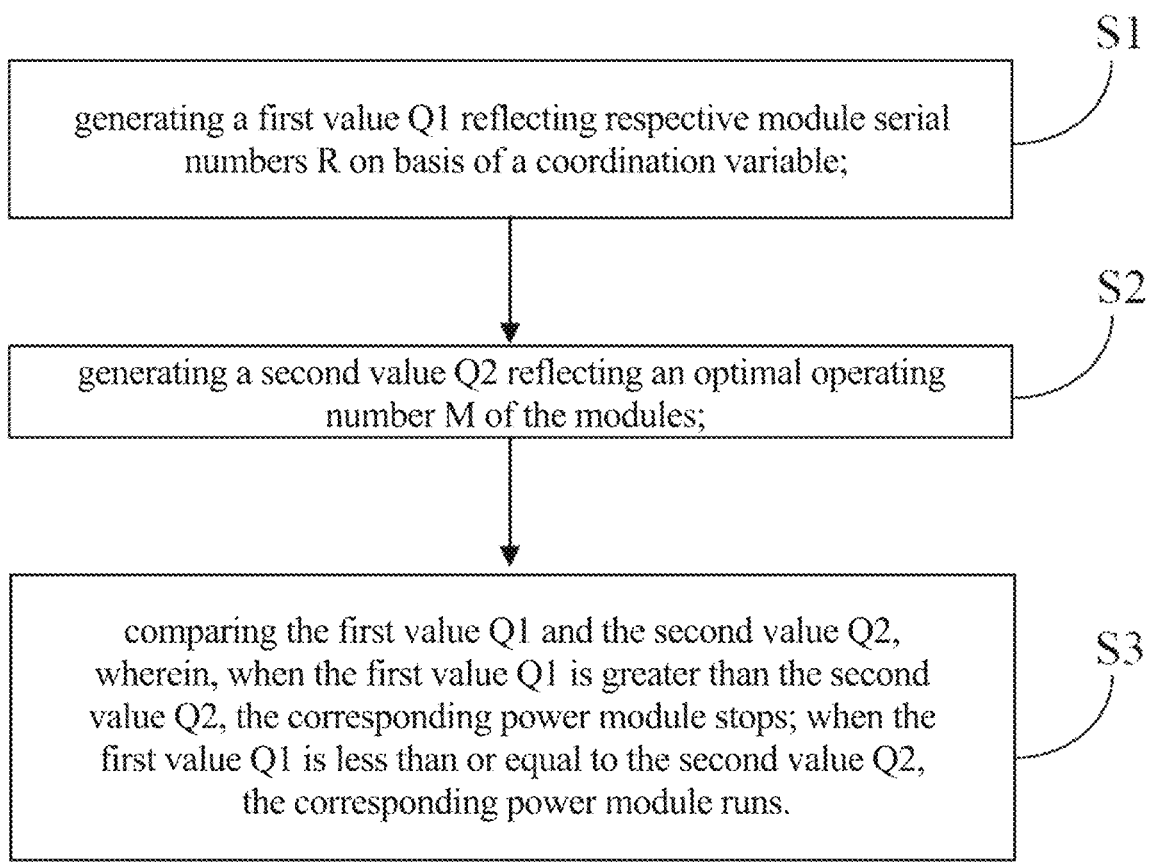
FIG. 2 is a schematic diagram of a control method for a power conversion system according to the disclosure.

The disclosure provides a method for controlling a distributed power conversion system, wherein the distributed power conversion system is a parallel combination system comprising, for example, N power modules connected in parallel, where N is a positive integer. Each of the power modules may comprise a first port, and the first ports of these power modules are connected in parallel. In the disclosure, the parallel combination system, for example, may be, but not limited to a system such as SST, ISOP, IPOP, or the like. In the disclosure, the N power modules can be controlled correspondingly by configuring N control units, and as shown in FIG. 2, each of the control units may be configured to execute:

step S1, generating a first variable Q1 reflecting respective module serial number R on basis of a coordination variable;

step S2, generating a second variable Q2 reflecting the optimal operating number M of the modules; and step S3, comparing the first variable Q1 and the second variable Q2, wherein, when the first variable Q1 is greater than the second variable Q2, the corresponding power module stops; and when the first variable Q1 is less than or equal to the second variable Q2, the corresponding power module runs.

In the disclosure, a running time for each power module is the same within one carrier period. Moreover, when one power module is selected to run, it is, for example, in a burst mode.

In step S1, each of the control units compares the respective coordination variables and the coordination variables of other power modules, to obtain respective ranking as the respective module serial number. The coordination variable may be, for example, one of the following information: a voltage, an operating time, a temperature, a current, a power, and a carrier wave. The voltage may be, for example, a series-side voltage of the power modules. The operating time may be, for example, a duration during which the power modules run. The current may be, for example, an input current, an output current or an inductive current of the power modules. The power may be, for example, an input power or an output power of the power modules. However, it can be understood that the coordination variable is not limited to the above information and may also be other information. The disclosure is not limited thereto. By coordinating operation among the modules of the system through the coordination variables of the power modules, the present disclosure may improve system efficiency, reduce an output voltage ripple and an output current ripple, and realize balanced operation between the modules.

For example, taking the case in which the coordination variable is the carrier wave as an example, step S1 may comprise:

step S11, configuring, by each of the control units, a carrier period and a carrier peak amplitude of the respective power module, wherein carriers of the adjacent power modules shift $2\pi/N$ with respect of each other, and determining a phase-shifting sequence of the respective power modules by using ID numbers of the respective power modules; and step S12, communicating, by each of the control units, a carrier value of the corresponding power module as the coordination variable and comparing it with carrier values of other power modules, to obtain respective rankings as the respective module serial numbers and generate the first variable Q1 reflecting the respective module serial numbers.

In step S2, for example, the second variable Q2 reflecting the optimal operating number of the modules is generated by each of the control units.

Regarding to S1 and S2, in one embodiment, the first variable Q1 reflecting the respective module serial numbers may be the same as the respective module serial numbers R, or a variable reflecting the respective module serial numbers R obtained by a certain rule. Similarly, the second variable Q2 reflecting the optimal operating number of the modules may be the same as the optimal operating number M, or a variable reflecting the optimal operating number M obtained by a certain rule, wherein the rules are the same. In one embodiment, the first variable Q1 and the module serial numbers R are in a linear relation, i.e., Q1=k*R, and the second variable Q2 and the optimal operating number M is also in a linear relation, i.e., Q2=k*M, where k is a positive number. Of course, the first variable Q1 and the second variable Q2 may also be obtained by using other rules, but the present disclosure is not limited thereto.

In step S3, each of the control units, for example, compares the second variable Q2 and the first variable Q1, and generates corresponding drive signal to drive the respective power module to run or stop.

Figure 3A:
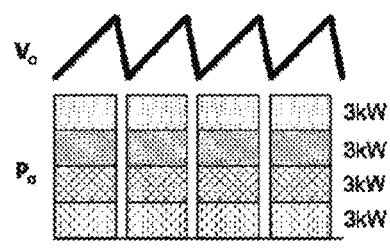
FIGS. 3A, 3B, and 3C are schematic diagrams illustrating technical effects of a coordination control method of a power conversion system in different operating states under different system load powers according to the disclosure.
Figure 3B:
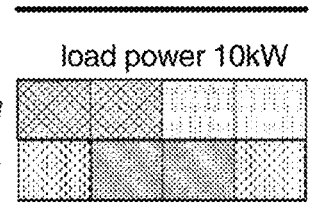
Figure 3C:
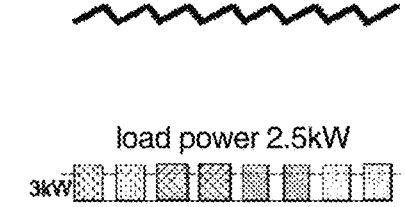

FIGS. 3A, 3B, and 3C illustrate technical effects of a coordination control method in different operating states under different system load powers according to the disclosure. Explanations are made by taking four DC/DC modules with a rated power of 15 kW connected in parallel as an example and assuming that a single module enters a burst mode under 3 kW. As shown in FIG. 3A, if the load power is 10 kW, and the operations are decentralized controlled, i.e., without coordination control method, all power modules enter an operating state in the burst mode, and a large ripple of an output voltage is resulted. As shown in FIG. 3B, if a coordination control method is enabled to operate the modules alternatively, with only two of the modules operating at each moment and each module taking a power of 5 kW, all power modules do not enter the burst mode, so that a total power of the entire system is continuous and the ripple of the output voltage is reduced. As shown in FIG. 3C, when the load power is 2.5 kW, which is less than the burst mode threshold power 3 kW, only one module is enabled to operate alternatively at a time. Although the total power of the system is discontinuous through alternative operation, the voltage ripple is reduced to ¼ with the same output filter capacitor. Different patterns in the figures represent different power modules, and different patterns on the same longitudinal axis represent the power modules working simultaneously. As can be seen, through coordination control operation, the number of operating modules in the disclosure is also decreased as the power is reduced, so the system can always work in a high efficient area.

Figure 3D:
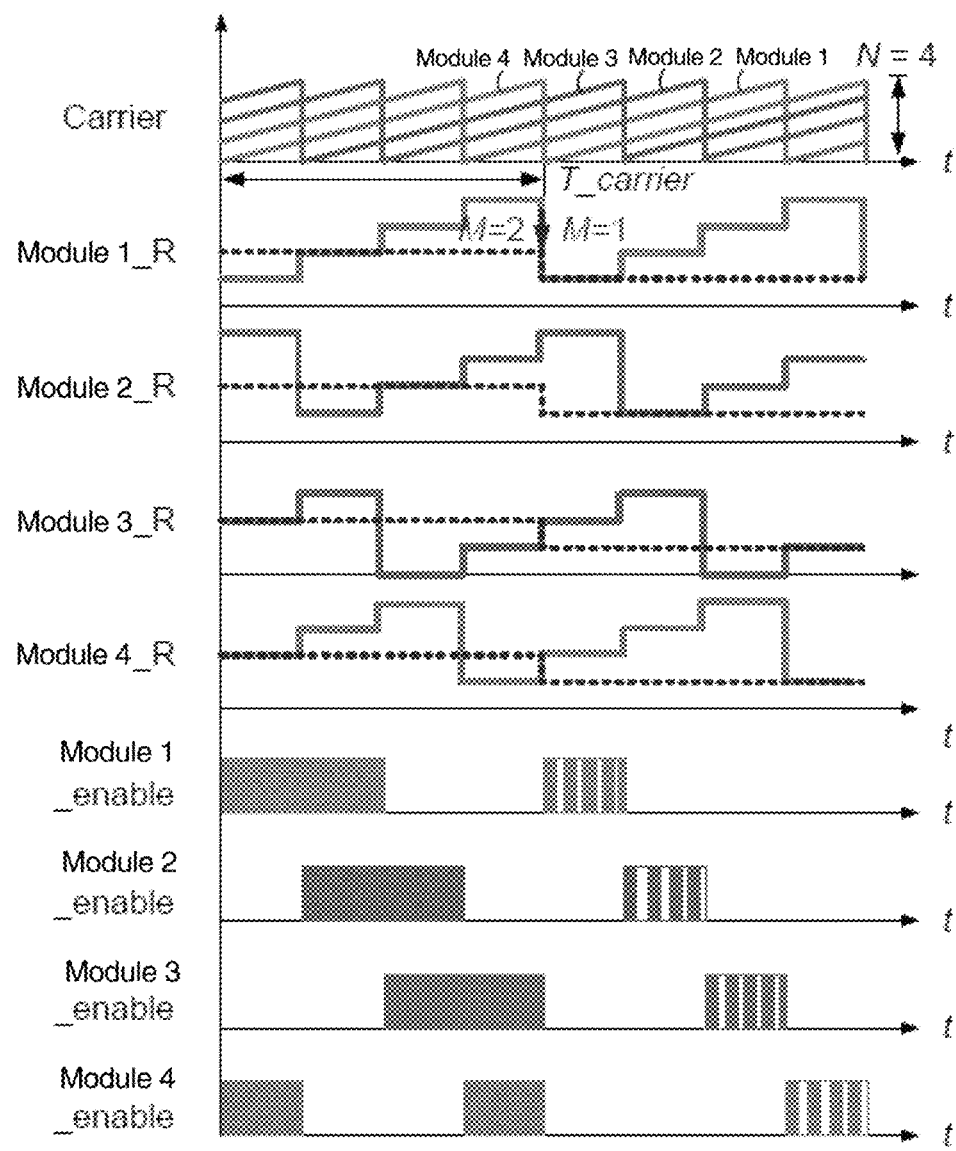
FIG. 3D is a schematic diagram of a method for performing coordination control of N power modules of the system by using a carrier wave as a coordination variable according to the disclosure.

Hereinafter taking the case in which the carrier wave is used as the coordination variable as an example, a method for controlling coordination operation of a distributed power conversion system of the disclosure is further explained in detail. As shown in FIG. 3D, firstly, a carrier period T_carrier is selected, a carrier peak amplitude is configured to be N (N is a total number of the power modules), and the carrier waves of the adjacent power modules are configured to shift $2\pi/N$ with respect to each other, and a phase-shifting sequence of the respective power modules is determined with ID numbers of the respective power modules. For example, in the figure there are four power modules, i.e., modules Module 1-Module 4, and the corresponding carrier waves sequentially shift $2\pi/4$. Then, a carrier value of the respective power module is used as the coordination variable to communicate and compare with the coordination variables of other power modules, to obtain ranking of that power module, which is output as the module serial number R ($1 \leq R \leq N$). That is, the first variable Q1 for reflecting the respective module serial numbers is generated, for example, Q1=R. In FIG. 3D, solid lines in the $2^{nd}$ to $5^{th}$ waveforms represent a value of Q1 at present. If M ($1 \leq M \leq N$) modules run (i.e., the optimal operating number of the modules is M), the amplitude of the modulation waves is M. That is, the second variable Q2 for reflecting the optimal operating number Q2 of the modules is generated, for example, Q2=M. In FIG. 3D, dashed lines in the $2^{nd}$ to $5^{th}$ waveforms represent a value of Q2 at present. If $R \leq M$, the corresponding power module runs, i.e., is switched in, and if R>M, the corresponding power module stops, i.e., is switched out.

In this embodiment, since a carrier phase is relevant to the ID number which has been set when the module is initialized, so real-time communication is unnecessary. In addition, communication is also available by using information such as a series-side voltage, a running time, a temperature, a current, and a power as the coordination variable, to realize a distributed coordination operation control. In such way, alternation of the modules may be realized automatically. The control method of the disclosure has a low requirement for a communication rate and facilitates realizing with a distributed controller. Meanwhile, alternative operation of a plurality of modules can avoid inconsistency of an aging degree of the respective modules. As for an input series system, high speed switching can ensure voltage balance of the dc-link.

Figure 4A:
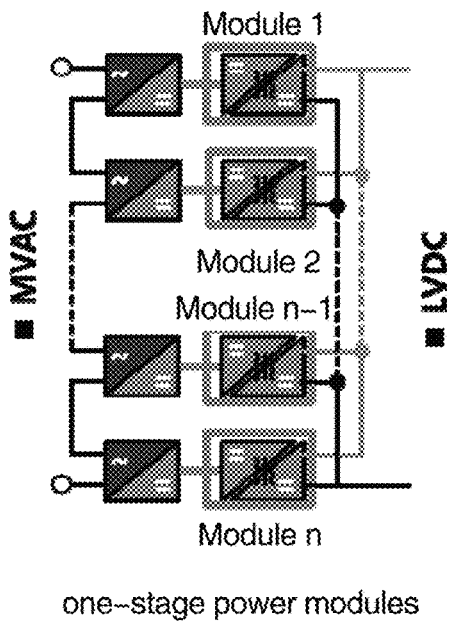
Figure 4B:
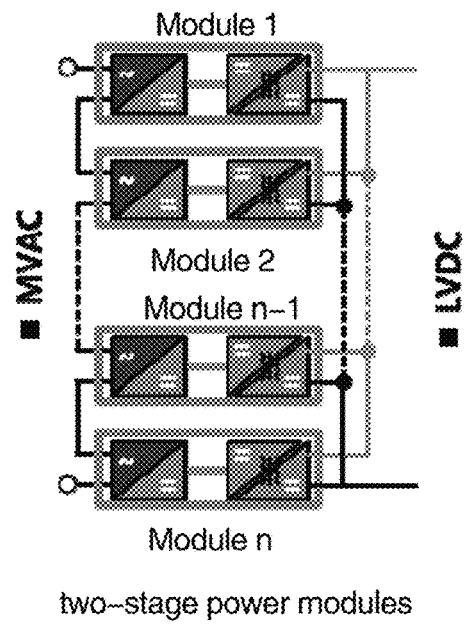

In one embodiment of the disclosure, each of the power modules may be a one-stage power module having one-stage power conversion units. In other embodiments, each of the power modules may also be a two-stage power module having first-stage power conversion units and second-stage power conversion units in cascade connection. Moreover, when the power modules run or stop, either the first-stage power conversion units or the second-stage power conversion units run or stop, or both the first-stage power conversion units and the second-stage power conversion units run or stop simultaneously. As shown in FIGS. 4A and 4B, with respect to a two-stage converter, alternative switching can be realized by only one stage. For example, only alternative switching second-stage DC/DC units of the respective modules Module 1-Module n in FIG. 4A. For another example, switching first-stage A2D units and the second-stage DC/DC units of the respective modules Module 1-Module n simultaneously in FIG. 4B.

In the disclosure, to optimize system efficiency and reduce the ripple of the output voltage, the number M of the running modules may also be optimized. In other words, step S2 may further comprise: step 21, optimizing the optimal operating number M of the running modules. The optimized method, for example, may comprise: firstly, determining a best efficiency point (BEP) power $P_{opt}$ corresponding to the BEP of the N power modules; secondly, multiplying an average output power $P_{local}$ of each power modules and a total number N of the power modules, to obtain a total system power of the distributed power conversion system, and calculating and rounding a ratio of the total system power to the BEP power $P_{opt}$ to obtain a calculated operating value $M_{cal}$; and determining the optimal operating number $M=M_{cal}$ or $M_{cal}+1$ of the running modules according to a principle that an individual module operating power is closest to the BEP.

In the disclosure, an algorithm for determining the optimal operating number M of the running modules is as follows:

$$M_{cal} = \text{floor}\left(\frac{N \cdot P_{local}}{P_{opt}}\right), \text{ wherein if}$$

$$\left|P_{opt} - \frac{N \cdot P_{local}}{M_{cal}}\right| > \left|P_{opt} - \frac{N \cdot P_{local}}{(M_{cal}+1)}\right|, \text{ then } M = M_{cal} + 1, \text{ or } M = M_{cal}.$$

Explanations are made by taking 15 kW*4 modules as an example and assuming a BEP power $P_{opt}$=7.5 kW, the best efficiency range being from 5 kW to 10 kW, and a power entering the Burst mode being $P_{burst}$=3 kW. The operating number corresponding to the total power range can be obtained from the above optimization algorithm. As shown in Table 1, as the power is reduced, the operating number is decreased to ensure that the respective modules work near the BEP when the power of the respective modules is 10 kW or more, and after the coordination control method of the disclosure is adopted, a threshold power when the system enters the burst mode is reduced from 12 kW to 3 kW.

TABLE 1

Example of Optimizing Operating Number

| Total Power Range | Operating Number | Power Range of Single Module | System |
|---|---|---|---|
| 25.7kW~60 kW | Four simultaneously | 6.43 kW~15 kW | System operates continuously |
| 18 kW~25.7 kW | Three alternatively | 6 kW~8.57 kW | System operates continuously |
| 10 kW~18 kW | Two alternatively | 5 kW~9 kW | System operates continuously |
| 3 kW~10 kW | One alternatively | 3 kW~10 kW | System operates continuously |
| 0 kW~3 kW | One alternatively | 0 kW~3 kW | Burst mode |

Figure 5:
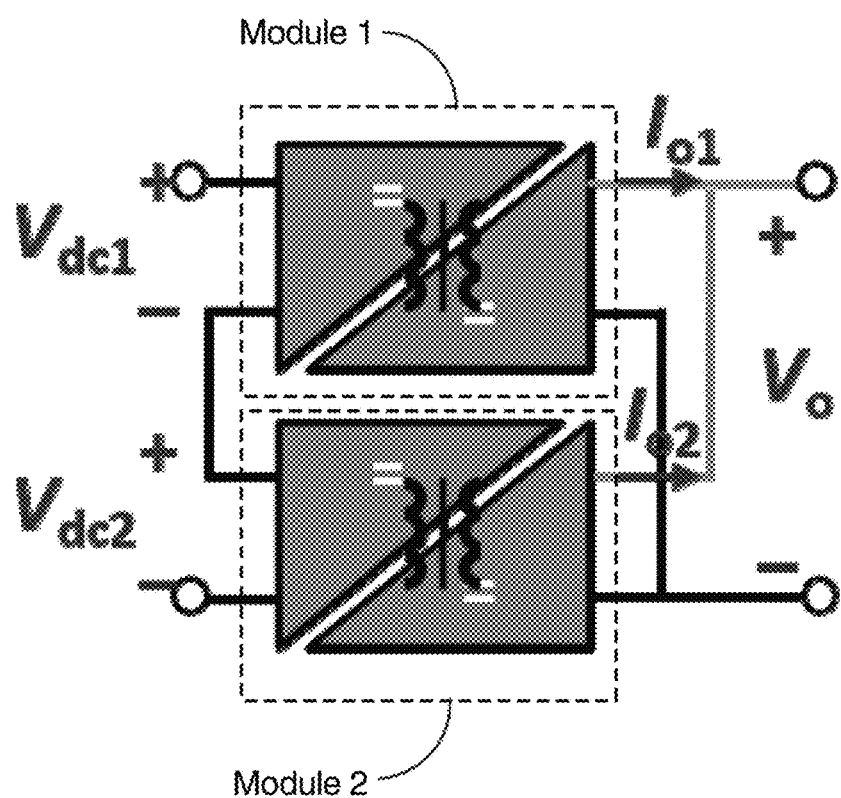
FIG. 5 is a schematic diagram of a simulation model when simulation is made taking Input Series Output Parallel (ISOP) of two modules as an example according to the disclosure.
Figure 6:
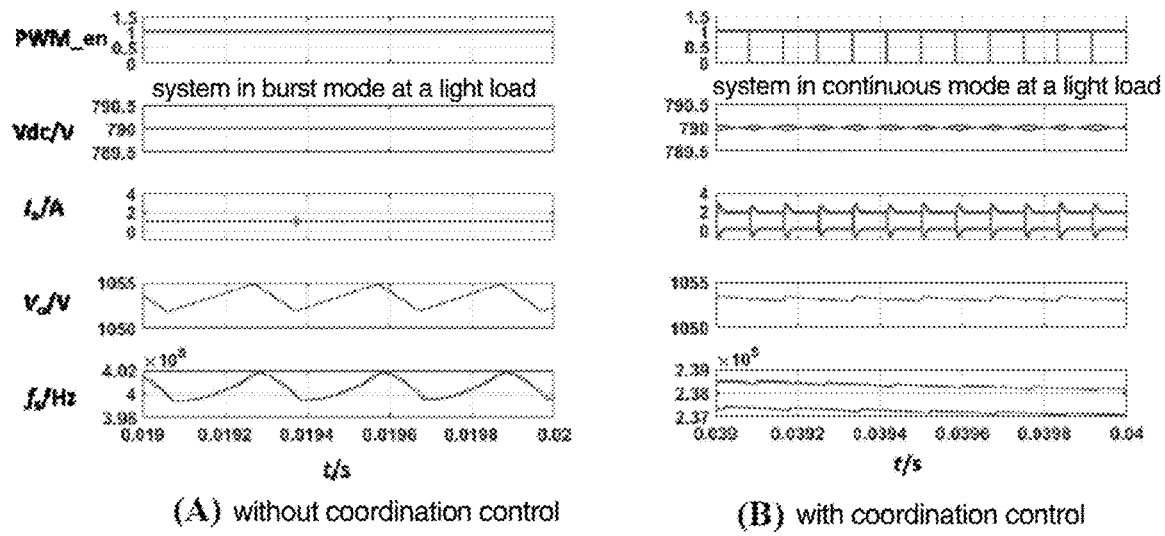
FIG. 6 is a schematic diagram of simulation results when the simulation model shown in FIG. 5 under light load is without coordination control (A) and with coordination control (B).
Figure 7:
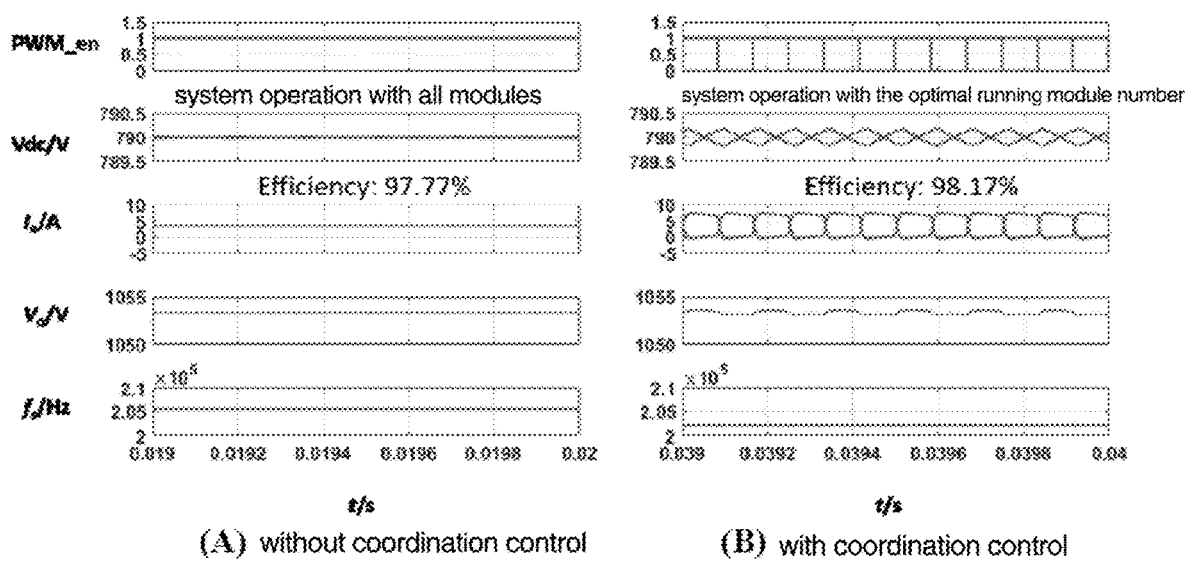
FIG. 7 is a schematic diagram of simulation results when the simulation model shown in FIG. 5 under heavy load is without coordination control (A) and with coordination control (B).

Simulation is made by taking Input Series Output Parallel (ISOP) of two modules Module 1 and Module 2 as an example, and simulation model is shown in FIG. 5. Simulation results are shown in FIGS. 6 and 7, wherein PWM_en is a switching signal of the modules Module 1 and Module 2, 1 stands for switching-in, and 0 stands for switching-out; $V_{dc}$ stands for input voltages $V_{dc1}$ and $V_{dc2}$ of the two modules, $i_o$ stands for output currents $i_{o1}$ and $i_{o2}$ of the two modules, $V_o$ is an output voltage, and $f_s$ stands for switching frequencies $f_{s1}$ and $f_{s2}$ of the two modules. Load conditions in left FIG. (A) and right FIG. (B) of FIG. 6 are the same, and the load is light (i.e., a light load). Without a coordination control, as shown in the left FIG. (A), both two modules Module 1 and Module 2 run, so that the power of each module is low, the modules are in the burst mode, and the ripple of the output voltage $V_o$ is large. With the coordination control, as shown in right FIG. (B), the two modules Module 1 and Module 2 are operated alternatively, so that the power of each module is increased, the operating state of the system is changed from burst mode to continuous mode, and the ripple of the output voltage $V_o$ is reduced. Load conditions in left FIG. (A) and right FIG. (B) of FIG. 7 are the same, but the load is heavier (i.e., a heavy load). Without a coordination control, as shown in the left FIG. (A), the system is in continuous mode, but the two modules Module 1 and Module 2 are operated simultaneously, so that output powers of the respective modules are low, resulting a low system efficiency. With the coordination control, as shown in right FIG. (B), the number of the operating modules is optimized, i.e., the two modules are operated alternatively, so that the power of the single module is increased, resulting an improved system operating efficiency.

Figure 8:
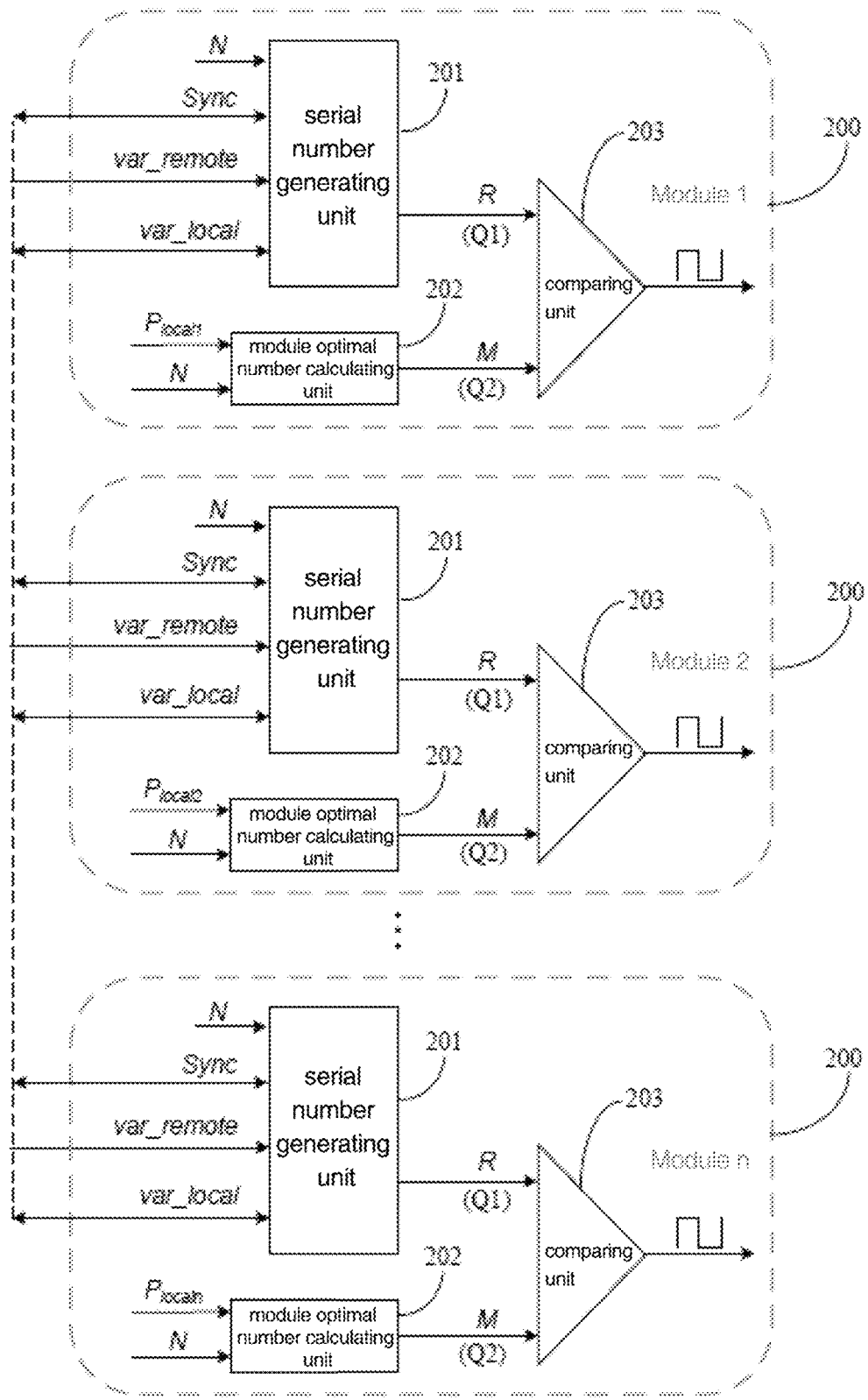
FIG. 8 is a structural diagram when a device for controlling a distributed power conversion system realizes distributed coordination operation according to the disclosure.

FIG. 8 illustrates a structure when a control device for a distributed power conversion system realizes distributed coordination operation according to the disclosure. The distributed power conversion system may comprise, for example, n power modules Module 1 to Module n. The control device may comprise, for example, n control units 200 (e.g., integrated into n control chips, respectively) for controlling the power modules Module 1 to Module n correspondingly. The method for driving the respective power modules may be implemented separately by the control chips of the respective power modules. Each control unit 200 may comprise, for example, three units: a serial number generating unit 201, a module optimal number calculating unit 202, and a comparing unit 203. The serial number generating unit 201 receives the coordination variables by communication among the modules, compares the coordination variable of the present module and the coordination variables of other modules, and sorts the coordination variables, to obtain ranking of the present module, which is output as the module serial number R ($1 \leq R \leq N$). That is, a first variable Q1 for reflecting respective module serial numbers R is generated. The module optimal number calculating unit 202 receives a variable reflecting power, and outputs the optimal operating number M ($1 \leq M \leq N$) of the modules. That is, a second variable Q2 reflecting the optimal operating number M of the modules is generated. The comparing unit 203 compares the first variable Q1 reflecting R and the second variable Q2 reflecting M. If Q1>Q2, the corresponding modules are switched out, and if Q1≤Q2, the corresponding modules are switched in. The coordination variable among the modules may be information such as a series-side voltage, a running time, a temperature, a current (an input voltage, an output voltage, an inductive current, etc.), a power (an input power, an output power, etc.), a carrier wave (real-time communication is unnecessary), or the like.

Correspondingly, the disclosure may provide a device for controlling a distributed power conversion system, comprising N control units for controlling N power modules connected in parallel of the distributed power conversion system correspondingly. Each of the control units may comprise: a serial number generating unit for generating a first variable Q1 reflecting respective module serial numbers R on basis of a coordination variable; an operating number calculating unit for generating a second variable Q2 reflecting the optimal operating number M of the modules; and a comparing unit for comparing the first variable Q1 and the second variable Q2, wherein when the first variable Q1 is greater than the second variable Q2, the respective power module stops; and when the first variable Q1 is less than or equal to the second variable Q2, the respective power module runs.

In one embodiment of the disclosure, a running time for each of the power modules is the same within a carrier period.

In one embodiment of the disclosure, the serial number generating unit of each of the control units is to compare the respective coordination variables and the coordination variables of other power modules to obtain respective rankings as the respective module serial numbers. The coordination variable may be one of the following information: a voltage, an operating time, a temperature, a current, a power and a carrier wave. The voltage may be a series-side voltage of the power modules, the operating time may be a duration during which the power module runs, the current may be an input current, an output current or an inductive current of the power modules, and the power may be an input power or an output power of the power modules.

In one embodiment of the disclosure, the coordination variable, for example, may be the carrier wave. The serial number generating unit of each of the control units may configure a carrier period and a carrier peak amplitude of the corresponding power module, wherein carriers of the adjacent power modules shift $2\pi/N$ with respect to each other, and determine a phase-shifting sequence of the respective power modules by using ID numbers of the respective power modules; and communicate a carrier value of the respective power module as the coordination variable and compare it with carrier values of other power modules, to obtain respective rankings as the respective module serial numbers and generate the first variable Q1 reflecting the respective module serial numbers. The operating number calculating unit of each of the control units generates the second variable Q2 reflecting the optimal operating number M of the modules. The comparing unit of each of the control units compares the second variable Q2 and the first variable Q1 and generates corresponding drive signals to drive the corresponding power modules to run or stop.

In one embodiment of the disclosure, the operating number calculating unit may be further configured to optimize the optimal operating number M of the running modules, wherein: the operating number calculating unit determines a best efficiency point (BEP) power $P_{opt}$ corresponding to the BEP of the N power modules; the operating number calculating unit multiplies an average output power $P_{local}$ of each power modules and a total number N of the power modules to obtain a total system power of the distributed power conversion system, calculates a ratio of the total system power to the BEP power $P_{opt}$ and rounds the ratio to obtain a calculated operating value $M_{cal}$; and the operating number calculating unit determines the optimal operating number $M=M_{cal}$ or $M_{cal}+1$ of the running modules according to a principle that an individual module operating power is closest to the BEP.

An algorithm for determining the optimal operating number M of the running modules by the operating number calculating unit is as follows:

$$M_{cal} = \text{floor}\left(\frac{N \cdot P_{local}}{P_{opt}}\right), \text{ wherein if}$$

$$\left|P_{opt} - \frac{N \cdot P_{local}}{M_{cal}}\right| > \left|P_{opt} - \frac{N \cdot P_{local}}{(M_{cal}+1)}\right|, \text{ then } M = M_{cal} + 1, \text{ or } M = M_{cal}.$$

In one embodiment of the disclosure, each of the power modules may comprise a first port, and the first ports of the N power modules are connected in parallel.

In one embodiment of the disclosure, each of the power modules may be a one-stage power module having one-stage power conversion units. Alternatively, each of the power modules may be a two-stage power module having first-stage power conversion units and second-stage power conversion units in cascade connection, wherein when the power modules run or stop, either the first-stage power conversion units or the second-stage power conversion units run or stop, or both the first-stage power conversion units and the second-stage power conversion units run or stop simultaneously.

In one embodiment of the disclosure, when one power module is selected to run, it is in a burst mode.

As for the distributed power conversion system comprising N power modules connected in parallel, the control method of the disclosure can coordinate operation among the modules of the system through the coordination variable among the power modules, improve system efficiency, reduce an output voltage ripple and an output current ripple, and realize balanced operation among the modules. The control method of the disclosure is simple and reliable, and as compared to the existing solution, a centralized controller is unnecessary, thereby avoiding the problem of single point failure of the centralized controller and reducing cost.

The disclosure has stronger voltage balancing capability of the dc-link voltage while having no influence on power transmission characteristics of the converter through alternative switching of all power modules in a certain sequence, has a low requirement for a communication rate, and is suitable for the distributed power conversion system having multiple modules connected in parallel, for example, including, but not limited to a data center, a charging station, an energy storage system and micro-grid, or the like.

Exemplary embodiments of the disclosure have been shown and described in detail. It shall be understood that the disclosure is not limited to the disclosed embodiments. Instead, the disclosure intends to cover various modifications and equivalent settings included in the spirit and scope of the appended claims.

What is claimed is:

1. A method for controlling a distributed power conversion system, wherein the distributed power conversion system comprises N power modules connected in parallel, where N is a positive integer, the method comprising:
configuring N control units for controlling the N power modules respectively, wherein each of the control units is configured to execute:
step S1, generating a first variable Q1 reflecting respective module serial number R on basis of a coordination variable;
step S2, generating a second variable Q2 reflecting an optimal operating number M of the modules; and step S3, comparing the first variable Q1 and the second variable Q2, wherein, when the first variable Q1 is greater than the second variable Q2, the corresponding power module stops;

when the first variable Q1 is less than or equal to the second variable Q2, the corresponding power module runs.

2. The method for controlling a distributed power conversion system according to claim 1, wherein the first variable Q1 is k*R, and the second variable Q2 is k*M, where k is a positive number.

3. The method for controlling a distributed power conversion system according to claim 1, wherein a running time for each of the power modules is the same within a carrier period.

4. The method for controlling a distributed power conversion system according to claim 1, wherein in step S1, each of the control units compares respective coordination variable and the coordination variables of other power modules to obtain respective ranking as the respective module serial number.

5. The method for controlling a distributed power conversion system according to claim 4, wherein the coordination variable is one of the following information: a voltage, an operating time, a temperature, a current, a power, and a carrier wave.

6. The method for controlling a distributed power conversion system according to claim 5, wherein the voltage is a series-side voltage of the power modules, the operating time is a period during which the power module runs, the current is an input current, an output current, or an inductive current of the power modules, and the power is an input power or an output power of the power module.

7. The method for controlling a distributed power conversion system according to claim 5, wherein the coordination variable is the carrier wave, and step S1 comprises:

step S11, configuring, by each of the control units, a carrier period and a carrier peak amplitude of the respective power module, wherein carriers of the adjacent power modules shift $2\pi/N$ with respect to each other, and determining a phase-shifting sequence of the respective power modules by using ID numbers of the respective power modules; and step S12, communicating, by each of the control units, a carrier value of the respective power module as the coordination variable and comparing it with carrier values of other power modules, to obtain respective rankings as the respective module serial numbers and generate the first variable Q1 reflecting the respective module serial numbers R;

step S2 of generating the second variable Q2 reflecting the optimal operating number M of the modules is performed by each of the control units; and step S3 of comparing the second variable Q2 and the first variable Q1 is performed by each of the control units, which then generates respective drive signals to drive the respective power module to run or stop.

8. The method for controlling a distributed power conversion system according to claim 1, wherein step S2 further comprises:

step 21, optimizing the optimal operating number M of the running modules, comprising:

determining a best efficiency point (BEP) power $P_{opt}$ corresponding to the BEP of the N power modules;

multiplying an average output power $P_{local}$ of each power modules and a total number N of the power modules to obtain a total system power of the distributed power conversion system, calculating a ratio of the total system power to the BEP power $P_{opt}$ and rounding the ratio to obtain a calculated operating value $M_{cal}$; and determining the optimal operating number $M=M_{cal}$ or $M_{cal}+1$ of the running modules according to a principle that an individual module operating power is closest to the BEP.

9. The method for controlling a distributed power conversion system according to claim 8, wherein the optimal operating number M of the running modules is determined as follows:

$$M_{cal} = \text{floor}\left(\frac{N \cdot P_{local}}{P_{opt}}\right), \text{ wherein if}$$

$$\left|P_{opt} - \frac{N \cdot P_{local}}{M_{cal}}\right| > \left|P_{opt} - \frac{N \cdot P_{local}}{(M_{cal}+1)}\right|, \text{ then } M = M_{cal}+1, \text{ or } M = M_{cal}.$$

10. The method for controlling a distributed power conversion system according to claim 1, wherein each of the power modules comprises a first port, and the first ports of the N power modules are connected in parallel.

11. The method for controlling a distributed power conversion system according to claim 1, wherein each of the power modules is a one-stage power module having one-stage power conversion units.

12. The method for controlling a distributed power conversion system according to claim 1, wherein each of the power modules is a two-stage power module having first-stage power conversion units and second-stage power conversion units in cascade connection, wherein when the power modules run or stop, either the first-stage power conversion units or the second-stage power conversion units run or stop, or both the first-stage power conversion units and the second-stage power conversion units run or stop simultaneously.

13. The method for controlling a distributed power conversion system according to claim 1, wherein when one power module is selected to run, it is in a burst mode.

14. A device for controlling a distributed power conversion system, wherein the distributed power conversion system comprises N power modules connected in parallel, where N is a positive integer, the device comprising:

N control units for controlling the N power modules respectively, wherein each of the control units comprises:

a serial number generating unit for generating a first variable Q1 reflecting respective module serial numbers R on basis of a coordination variable;

an operating number calculating unit for generating a second variable Q2 reflecting an optimal operating number M of the modules; and a comparing unit for comparing the first variable Q1 and the second variable Q2, wherein when the first variable Q1 is greater than the second variable Q2, the corresponding power module stops; and when the first variable Q1 is less than or equal to the second variable Q2, the corresponding power module runs.

15. The device for controlling a distributed power conversion system according to claim 14, wherein the first variable Q1 is k*R, and the second variable Q2 is k*M, where k is a positive number.

16. The device for controlling a distributed power conversion system according to claim 14, wherein a running time for each of the power modules is the same within a carrier period.

17. The device for controlling a distributed power conversion system according to claim 14, wherein the serial number generating unit of each of the control units is to compare the respective coordination variable and the coordination variables of other power modules to obtain respective rankings as the respective module serial numbers.

18. The device for controlling a distributed power conversion system according to claim 17, wherein the coordination variable is one of the following information: a voltage, an operating time, a temperature, a current, a power and a carrier wave.

19. The device for controlling a distributed power conversion system according to claim 18, wherein the voltage is a series-side voltage of the power modules, the operating time is a duration during which the power module runs, the current is an input current, an output current or an inductive current of the power modules, and the power is an input power or an output power of the power modules.

20. The device for controlling a distributed power conversion system according to claim 18, wherein the coordination variable is the carrier wave, wherein, the serial number generating unit of each of the control units configures a carrier period and a carrier peak amplitude of the respective power module, wherein carriers of the adjacent power modules shift $2\pi/N$ with respect to each other, and determines a phase-shifting sequence of the respective power modules by using ID numbers of the respective power modules; and communicates, by each of the control units, a carrier value of the respective power module as the coordination variable and compares it with carrier values of other power modules, to obtain respective rankings as the respective module serial numbers and generate the first variable Q1 reflecting the respective module serial numbers R;

the operating number calculating unit of each of the control units generates the second variable Q2 reflecting the optimal operating number M of the modules;

the comparing unit of each of the control units compares the second variable Q2 and the first variable Q1 and generates respective drive signals to drive the respective power modules to run or stop.

21. The device for controlling a distributed power conversion system according to claim 14, wherein the operating number calculating unit is further configured to optimize the optimal operating number M of the running modules, wherein:

the operating number calculating unit determines a best efficiency point (BEP) power $P_{opt}$ corresponding to the BEP of the N power modules;

the operating number calculating unit multiplies an average output power $P_{local}$ of each power modules and a total number N of the power modules to obtain a total system power of the distributed power conversion system, calculates a ratio of the total system power to the BEP power $P_{opt}$ and rounds the ratio to obtain a calculated operating value $M_{cal}$; and the operating number calculating unit determines the optimal operating number $M=M_{cal}$ or $M_{cal}+1$ of the running modules according to a principle that an individual module operating power is closest to the BEP.

22. The device for controlling a distributed power conversion system according to claim 21, wherein the optimal operating number M of the running modules is determined by the operating number calculating unit as follows:

$$M_{cal} = \text{floor}\left(\frac{N \cdot P_{local}}{P_{opt}}\right), \text{ wherein if}$$

$$\left|P_{opt} - \frac{N \cdot P_{local}}{M_{cal}}\right| > \left|P_{opt} - \frac{N \cdot P_{local}}{(M_{cal}+1)}\right|, \text{ then } M = M_{cal} + 1, \text{ or } M = M_{cal}.$$

23. The device for controlling a distributed power conversion system according to claim 14, wherein each of the power modules comprises a first port, and the first ports of the N power modules are connected in parallel.

24. The device for controlling a distributed power conversion system according to claim 14, wherein each of the power modules is a one-stage power module having one-stage power conversion units.

25. The device for controlling a distributed power conversion system according to claim 14, wherein each of the power modules is a two-stage power module having first-stage power conversion units and second-stage power conversion units in cascade connection, wherein when the power modules run or stop, either the first-stage power conversion units or the second-stage power conversion units run or stop, or both the first-stage power conversion units and the second-stage power conversion units run or stop simultaneously.

26. The device for controlling a distributed power conversion system according to claim 14, wherein when one power module is selected to run, it is in a burst mode.

* * * * *